(No Model.)
R. D. BRADLEY.
BICYCLE KEEPER.
No. 605,628. Patented June 14, 1898.
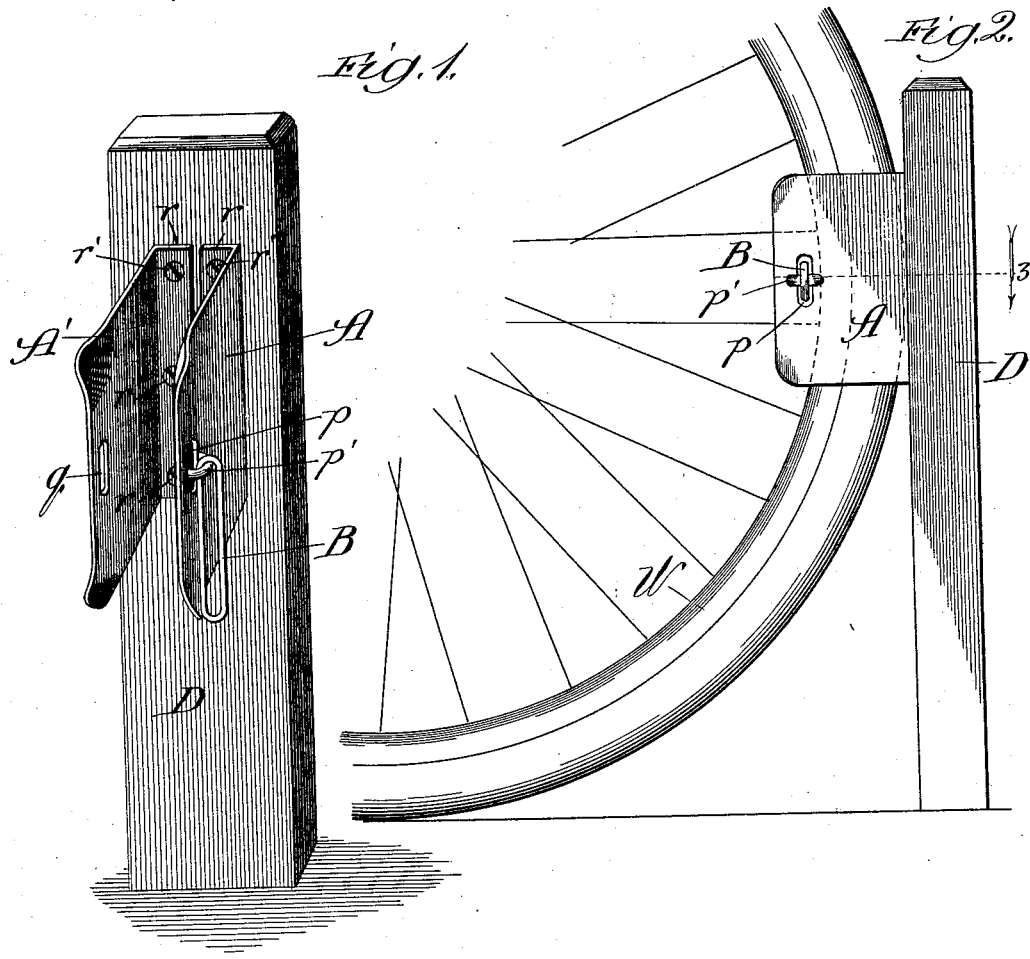
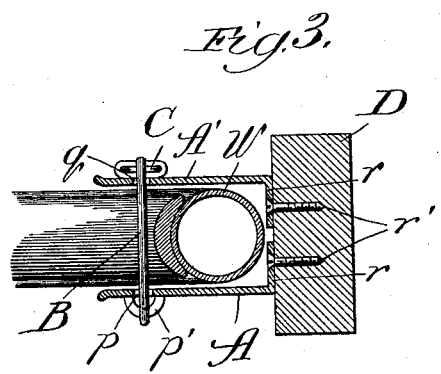
Witnesses:
Chas. S. Gaylord
Lute J. Felter
Inventor:
Rodney D. Bradley,
By Dyrenforth & Dyrenforth,
Att'ys
THE NORRIS PETERS CO., PHOTO-LITHO., WASHINGTON, D. C.

UNITED STATES PATENT OFFICE.

RODNEY D. BRADLEY, OF CHICAGO, ILLINOIS, ASSIGNOR OF ONE-HALF TO FRANK X. MUDD, OF SAME PLACE.

BICYCLE-KEEPER.

SPECIFICATION forming part of Letters Patent No. 605,628, dated June 14, 1898.

Application filed February 9, 1897. Serial No. 622,658. (No model.)

*To all whom it may concern:*

Be it known that I, RODNEY D. BRADLEY, a citizen of the United States, residing at Chicago, in the county of Cook and State of Illinois, have invented a new and useful Improvement in Bicycle-Keepers, of which the following is a specification.

My invention relates to an improvement in the class of devices for supporting a bicycle in upright position when out of use and for locking it, while stored or kept in that position, against theft.

The object of my invention is to provide a simple construction of bicycle-keeper which shall be cheap to manufacture and thoroughly effective in its purpose and which shall adapt it to be compactly put up for shipment and readily adjusted into position for use.

To these ends my invention consists in the general construction of my improved keeper, and it also consists in the details of construction and combinations of parts hereinafter described, and pointed out in the claim.

Referring to the accompanying drawings, Figure 1 is a perspective view showing my improved bicycle-keeper operatively applied to a post. Fig. 2 shows the same in side elevation with a bicycle-wheel, shown broken, adjusted in the keeper; and Fig. 3 is a section taken at the line 3 on Fig. 2 and viewed in the direction of the arrow.

The keeper comprises two similar side pieces A and A', which may best be formed of sheet metal, each with a flange $r$ extending along one edge at which to fasten it in place, as by means of screws $r'$. In use the sides A and A' are fastened, adjacent to each other the proper distance apart to form a socket to conform to and admit a bicycle-wheel W, to a wall, frame, post, or the like (represented at D) at a suitable height from the ground, floor, or other support for the bicycle to be kept. In the side pieces, near their forward edges, are provided, respectively, the slots $p$ and $q$, and from the outer side of the part A there projects a loop $p'$, the legs of which straddle the slot $p$ and in which is hung a hasp B, open throughout its length, that shown being formed of a length of adequately strong wire bent into the required endless shape illustrated.

Normally the hasp hangs from the loop $p'$ down along the outer side of the side piece A in convenient position for use after a bicycle-wheel has been introduced between the side pieces by sliding it on the loop through the slot $p$, across the inner perimeter of the wheel, and through the slot $q$, beyond which it projects, and may there be locked against unauthorized withdrawal by means of a padlock (indicated at C) hung in it, or by any other suitable form of lock, such as a bolt-lock, which may be provided in proper position on the outer surface of the side piece A' and worked with a key.

The construction of my improved keeper adapts it to be shipped in "knockdown" condition and to be done up for shipment in a very small package. Moreover, inasmuch as the flanges $r$ form the back of the keeper when it is fastened in operative condition a wheel W locked therein covers the screws $r'$ and obstructs access to them, thereby preventing the bicycle from being taken away by removing the keeper.

What I claim as new, and desire to secure by Letters Patent, is—

As a new article of manufacture, a bicycle-keeper comprising two slotted plates each of which is substantially L-shaped in cross-section and adapted to be secured to an upright to provide a recess to receive a portion of the wheel rim and tire, a staple on one of the plates adjacent to the slot therein, a link-hasp on said staple and adapted to be passed through the slots in both plates to secure the wheel in the recess, and locking means for said hasp, substantially as described.

RODNEY D. BRADLEY.

In presence of—
M. J. FROST,
R. T. SPENCER.